Aug. 23, 1955    W. S. STERLING    2,715,978
CLOSURE-HANDLING MACHINE
Filed April 21, 1951    4 Sheets-Sheet 1

INVENTOR.
Walter S. Sterling
BY
J. Stanley Churchill
ATTORNEY

Aug. 23, 1955  W. S. STERLING  2,715,978
CLOSURE-HANDLING MACHINE
Filed April 21, 1951  4 Sheets-Sheet 3

INVENTOR.
Walter S. Sterling
BY
ATTORNEY

Aug. 23, 1955 W. S. STERLING 2,715,978
CLOSURE-HANDLING MACHINE
Filed April 21, 1951 4 Sheets-Sheet 4

INVENTOR.
Walter S. Sterling
BY
J. Stanly Churchill
ATTORNEY

United States Patent Office 2,715,978
Patented Aug. 23, 1955

2,715,978

CLOSURE-HANDLING MACHINE

Walter S. Sterling, Quincy, Mass., assignor to Pneumatic Scale Corporation, Limited, Quincy, Mass., a corporation of Massachusetts Application April 21, 1951, Serial No. 222,219

13 Claims. (Cl. 221—160)

This invention relates to a closure-handling machine.

The invention has for an object to provide a novel and improved closure-handling machine adapted to withdraw closures, such as screw caps for glass or other containers, from a bulk supply thereof and to deliver the closures in an oriented position into a chute for delivery to a bottle-capping machine or other instrumentality in a gentle and efficient manner.

Another object of the invention is to provide novel and improved apparatus for withdrawing, orienting, and delivering closures which is adapted to maintain a maximum supply of oriented closures in the delivery chute while operated at a relatively slow speed and which is arranged to handle the closures in a smooth and gentle manner such as to reduce to a minimum liability of jamming and damage to the closures while passing through the apparatus.

With these general objects in view, and such others as may hereinafter appear, the invention consists in the closure-handling machine and in the various structures, arrangements, and combinations of parts hereinafter described and particularly defined in the claims at the end of this specification.

In the drawings illustrating the preferred embodiment of the invention.

In general, the present invention contemplates a closure-handling machine for use in connection with the feeding mechanism of a closure-applying machine or with other instrumentalities, such as a closure-lining machine or a closure-packing machine, wherein it is desired to deliver the closures, such as screw caps for bottles or other containers, in a line and oriented to face in the same direction. In the illustrated embodiment of the invention, provision is made for continuously withdrawing closures at random from a bulk supply thereof for guiding the closures between supporting and advancing elements comprising the orienting mechanism arranged to maintain the closures in a position of equilibrium when they are presented therebetween in a predetermined position, and arranged to reject the closures when they are presented between the supporting and advancing elements in other than the desired predetermined position, the balanced and oriented closures being advanced and delivered into the upper end of a feed chute for delivery to the feeding mechanism or other device in a position from which they may be conveniently and readily withdrawn and transferred to operative position with respect to other instrumentalities, such as the capping head of a bottle-capping machine.

In the present apparatus for handling and orienting closures, the closures are arranged to be oriented in a natural or inherent position of equilibrium which may vary with different shapes and sizes of closures. Only those closures which assume and maintain such position are advanced into the delivery chute and all other closures in different positions being overbalanced and rejected to be returned to the main supply and again presented to the orienting mechanism.

In one embodiment of the invention illustrated herein, particularly adapted for handling conical closures rounded at their upper ends, the closures are arranged to maintain their equilibrium when they assume a substantially upright and outwardly tilted position in the orienting mechanism. In another embodiment of the invention, particularly adapted for handling cylindrical closures which are relatively short with respect to their diameters, the closures are arranged to maintain their equilibrium in the orienting mechanism when they assume a substantially inverted and outwardly tilted position, and in a still further embodiment of the invention, particularly adapted for handling cylindrical closures which are relatively tall with respect to their diameters, the closures are arranged to maintain a balanced position between the orienting elements when they assume an inverted position and are tilted outwardly at an angle approaching the horizontal to be advanced into the delivery chute with their axes in a substantially horizontal plane.

The present closure-handling machine is further characterized by structure capable of handling the closures in a smooth and gentle manner with minimum liability of jamming or breakage of the closures, and with minimum liability of scratching or marring the finish of the closures during their progress through the machine. In practice, the present closure-handling machine is adapted to be operated at a relatively slow rate of speed while being capable of producing a relatively great number of oriented closures in a short space of time, sufficient to maintain an adequate supply of oriented closures in the delivery chute leading to the bottle-capping or other machine which may be operated at a relatively high rate of speed. The present closure-handling machine is also capable of handling a relatively wide range of shapes and sizes of closures with a minimum amount of adjustments to suit the particular closure to be run.

Figures 1, 3, 4, 5, 6, 7, 8:
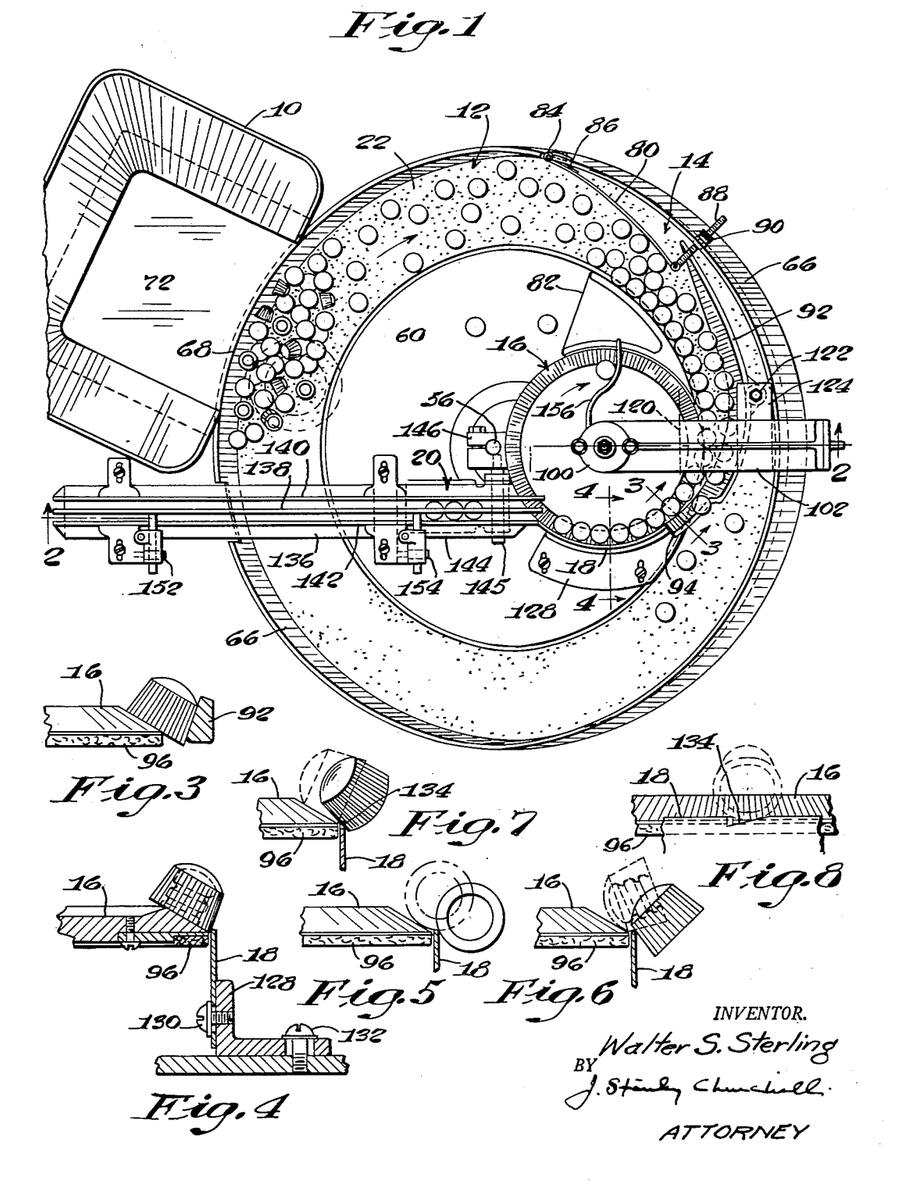
Fig. 1 is a plan view of the present closure-handling machine illustrating an embodiment particularly adapted for handling conically shaped closures.
Figs. 3 and 4 are cross-sectional detail views taken on the lines 3—3 and 4—4 respectively of Fig. 1, Fig. 4 illustrating the conical closure in a position of equilibrium between the supporting and advancing elements.
Figs. 5 and 6 are detail views similar to Fig. 4 and showing the closures being rejected when they are disposed in different non-balanced positions between the supporting elements.
Figs. 7 and 8 are side and front elevations respectively of a closure in still another position between the supporting elements and arranged to be rejected.
Figure 2:
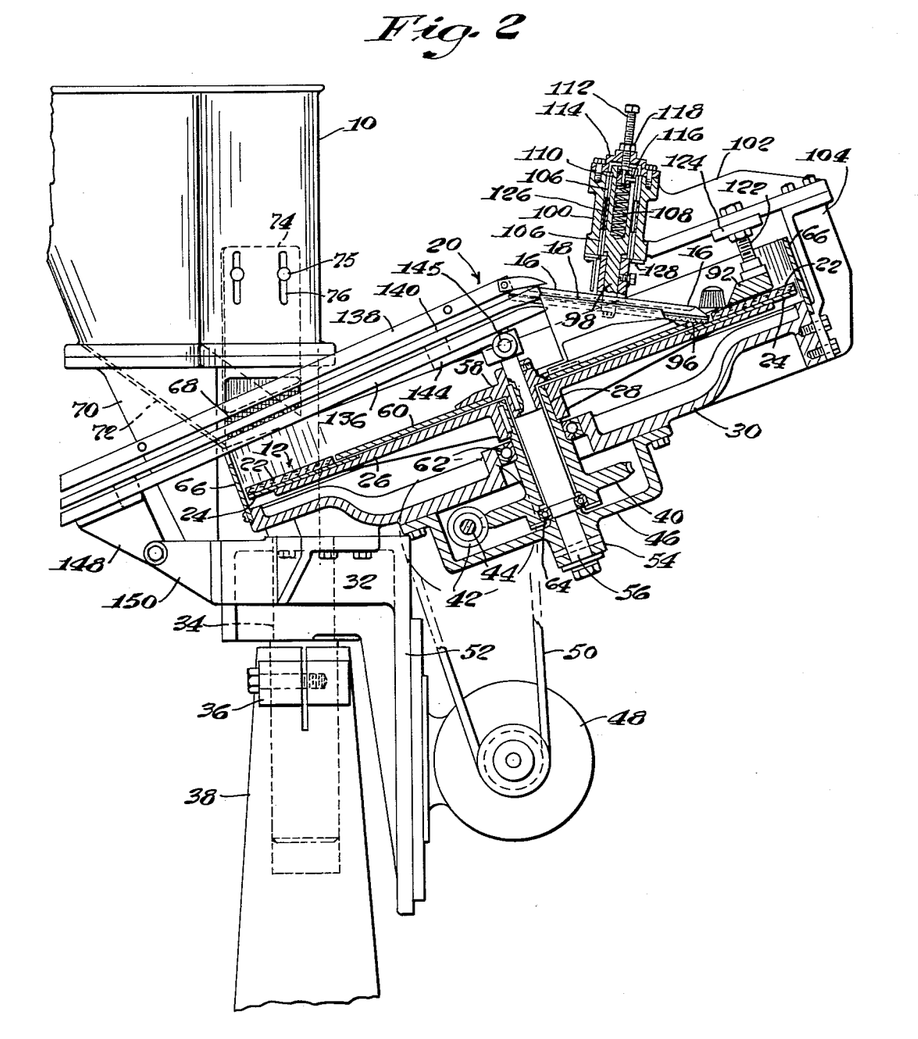
Fig. 2 is a cross-sectional view taken on the line 2—2 of Fig. 1.

Referring now to the drawings and particularly to Figs. 1 and 2, the closure-handling machine therein shown comprises in general a hopper 10 in which a bulk supply of closures may be stored and a rotary carrier, indicated generally at 12, arranged at an inclined plane and which is adapted to advance the closures deposited at the lower end thereof from the hopper and to carry the closures upwardly into engagement with guide means, indicated generally at 14, to form a line of closures. Successive closures arriving at the upper end of the inclined carrier are guided into engagement with the beveled marginal edge of a rotary orienting disk 16 arranged in a substantially horizontal plane or in a plane slightly inclined opposite from the inclination of the carrier disk 12, and as the closures are advanced along the edge of the orienting disk 16 they leave the carrier 12 and are supported between the beveled edge of the orienting disk 16 and a cooperating stationary closure-supporting rail 18. In operation, those closures assuming a desired predetermined position between the orienting disk 16 and the rail 18 are capable of maintaining their stability and are advanced into the upper end of a delivery or feed chute 20 for delivery to the closure-applying or other machine. Those closures assuming other than the desired position are incapable of maintaining their stability between the disk 16 and rail 18 and are permitted to fall back onto the carrier 12 to be returned to the main group of closures at the lower end of the carrier 12 to be again advanced into engagement with the orienting mechanism.

As herein shown, the rotary carrier, indicated generally at 12, includes an annular marginal facing portion 22 preferably comprising a friction material, such as cork, adapted to frictionally retain the closures thereon as they are carried upwardly on the inclined surface of the carrier. The facing portion 22 may be detachably secured to a flat metal ring 24 attached to a flange 26 which is keyed to a hollow shaft or sleeve 28 mounted for rotation in a circular supporting bracket 30. The circular bracket 30 may be attached to a supporting bracket 32, the latter being secured to the upper end of a shaft 34 which in turn may be adjustably supported by a clamp 36 formed in a supporting column 38 mounted on or forming a part of the frame of the closure-applying or other machine with which the present closure-handling and orienting apparatus may be used.

The hollow shaft or sleeve 28 may be formed integrally with a worm wheel 40 arranged to mesh with a worm gear 42 fast on a shaft 44 journaled in a gear box 46 secured to the underside of the circular bracket 30 and is arranged to be rotated by a motor 48 connected to the shaft by a belt and pulley drive 50. The motor 48 may be adjustably attached to a depending portion 52 of the supporting bracket 32. As herein shown, the gear box 46 may be provided with a hub 54 arranged to support a central stationary shaft 56 extending upwardly through the sleeve 28 and having a flange 58 at its upper end arranged to support a circular metal plate 60 substantially flush with the upper surface of the continuously rotating carrier facing 22, the circular plate 60 being of a diameter such as to extend within a short distance of the inside diameter of the facing 22, as shown in Fig. 2. The sleeve 28 may be rotatably supported by a ball bearing 62 interposed between the circular bracket 30 and the outside diameter of the sleeve, and by a second ball bearing 64 interposed between the stationary central shaft 56 and the inside diameter of the sleeve. As illustrated in Figs. 1 and 2, the circular bracket 30 is provided with an upstanding retaining rim or band 66 surrounding and extending above the upper surface of the carrier 12 for confining the closures within the carrier, and the supply hopper 10, supported adjacent the lower edge of the carrier, is provided with an opening 68 adjacent the upper edge of the retaining band 66 through which the closures may flow by gravity over the edge of the band and onto the carrier. The hopper 10 may be supported by a bracket 70 attached to the bracket 32, and the bottom wall 72 of the hopper may be inclined toward the hopper opening and may have its front edge curved to conform to the upper edge of the circular retaining band as shown in Fig. 1. The opening 68 may be adjusted by a plate 74 attached to the front wall of the hopper by screws 75 extended through slots 76 whereby the flow of the closures onto the rotary carrier may be controlled.

In operation, a bulk supply of the closures are deposited in the hopper, and when the closures come to rest on the carrier 12 they are withdrawn at random from the pile or group and are carried upwardly on the continuously rotating carrier. In practice, it has been found that a great majority of the closures which are thus withdrawn from the group tend to assume a natural and substantially uniform position of rest or equilibrium on the carrier in the desired position of orientation. For example, when running conical closures of the type illustrated in Fig. 2, the center of gravity of such closures is such as to cause them or a great majority of them to assume an upright position, that is, with the wide base or open end of the closure in engagement with the carrier as they are withdrawn from the group, the closures in such upright position maintaining their stability as they are carried upwardly in frictional engagement with the non-slip cork facing 22. The conical closures which assume an inverted or horizontal position will roll down the inclined carrier into engagement with the main group, such closures being continuously jostled and changed in position by the movement of the carrier and contact with adjacent closures until they assume an upright position whereupon they are carried away from the group, as described. As a result, the carrier 12, traveling at a relatively slow speed in the order of 10 to 15 revolutions per minute, which is conductive to smooth and gentle handling, is enabled to advance an unexpectedly large number of closures in the desired position of orientation in a relatively short time so that upon subsequent arrival at and passage through the orienting mechanism the majority of the closures are enabled to pass directly into the feed chute, and consequently a minimum number of closures are subject to rejection by the orienting mechanism.

As illustrated in Fig. 1, the closures being carried upwardly on the inclined surface of the carrier 12 are arranged to engage a yieldable guide rail 80 extending inwardly and angularly from the outer retaining band 66 and arranged to guide the closures against a fixed curved guide member 82 secured to the stationary plate 60 and extending substantially tangentially with respect to the periphery of the orienting disk 16, the yieldable rail 80 and the fixed guide 82 forming an elongated tapering path to cause the closures to form a single line against the fixed guide leading the closures to the orienting mechanism. The guide rail 80 may be supported at its lower end by a hinge 84 secured to one edge of a cutout portion of the band 66, the rail being yieldingly urged inwardly by a spring 86 coiled about the hinge pin with the ends of the spring in engagement with the band 66 and the rail 80 respectively. The other end of the rail 80 may be pivotally connected to the end of an elongated screw 88 extended through a clearance opening in the band 66 and provided with an adjusting nut 90 engageable with the outer surface of the band 66 to limit the inward extent of movement of the rail while permitting the rail to yield outwardly when the closures are crowded into the narrow end of the tapering path, thus preventing jamming or breakage of the closures. Surplus closures passing beyond the end of the tapering path may engage a curved guide member 92 having a beveled face arranged to urge the closures inwardly toward the line of closures formed against the fixed guide 82 along the inner marginal edge of the cork facing 22 to fill any gaps in the line leading to the orienting mechanism, and any surplus closures which are not permitted to enter the orienting mechanism are arranged to spill or crowd over the forward end 94 of the guide member 92 to be returned to the lower end of the carrier disk.

As herein shown, see Fig. 2, the orienting disk 16 is supported for rotation in a substantially horizontal or slightly inclined plane above the oppositely inclined surface of the carrier disk 12 and with the lower edge of the orienting disk in frictional driving engagement with the inwardly extended marginal edge of the metal supporting ring 24 on which the cork facing 22 is mounted, the underside of the orienting disk 16 being provided with a replaceable friction ring 96, as shown in Fig. 4, for engagement with the ring 24, thus providing a friction drive for the orienting disk rotating in a clockwise direction with the carrier. The orienting disk may be secured to the lower end of a shaft 98 rotatably journaled in the hub 100 of an angular outboard bracket 102 attached to a bracket 104 which in turn is mounted on the circular supporting bracket 30. The shaft 98 may and preferably will be rotatably supported in needle bearings 106 provided in the hub 100 and in a manner such as to permit longitudinal axial movement of the shaft, and a compression spring 108 supported in a socket formed in the upper end of the shaft is arranged to apply downward pressure to urge and retain the disk 16 in frictional driving engagement with the metal ring 24. The upper end of the spring 108 is arranged to engage a spring cap 110 rotatably mounted on the lower end of an adjusting screw 112 carried in a cap member 114 attached to the upper end of the hub 100. The spring cap 110 may be provided with a laterally extended pin 116 engageable with the edges of a slot formed in the shaft 98 to effect rotation of the cap and the spring with the shaft, and the screw 112 may be locked in its adjusted position by a nut 118. As indicated in Figs. 1 and 2, the central supporting plate 69 may be provided with a cut-out portion 120 at its upper end to provide a clearance for the edge of the orienting disk 16 in frictional engagement with the carrier ring 24. The curved guide member 92 may be adjustably supported above the carrier disk by a stud 122 carried by a plate 124 secured to the underside of the angular bracket 102. The needle bearings 106 in the hub 100 may be separated by spacers 126, and the lower end of the hub may be provided with a retaining ring 128.

In operation, successive substantially upright closures in the line guided into engagement with the orienting disk are intially suspended between the carrier facing 22 and the beveled edge of the orienting disk, as shown in Fig. 2, and as they are advanced in this position by the rotation of the disks and by the pressure of succeeding closures in the line, the closures leave the carrier and are suspended between the inclined edge of the guide rail 92 and the beveled marginal edge of the orienting disk 16, as illustrated in Fig. 3. As the closures are further advanced in a substantially upright position along the edge of the rotary orienting disk, they are guided by the forward end of the rail 92 into engagement with the stationary curved supporting rail 18 arranged to support the edge of the closures on the disk 16 as they advance, as illustrated in Fig. 4.

The curved supporting rail 18 may and preferably will be substantially concentric with the orienting disk 16 and may be adjustably supported by a bracket 128 carried by the center plate 69. As illustrated in Fig. 2, the upper edge of the rail 18 may be substantially parallel with the plane of the orienting disk and is arranged to be adjusted in height and in laterally spaced relation to the edge of the orienting disk by screw and slot connections 130, 132 respectively, as shown in Fig. 4. In practice, the rail may be adjusted to extend a short distance above the lower edge of the beveled portion of the disk 16, as illustrated, to support the cylindrical edge of the base portion of a substantially upright conical closure, the base of the closure resting on the beveled edge, and in this position the center of gravity of the conical closure illustrated is such as to enable it to maintain its stability and to be advanced into the delivery chute 20 arranged at one side of and adjacent the rear edge of the orienting disk, as illustrated.

The above description applies to the passage of those conical closures which arrive at the orienting station in the desired position of orientation, that is, in a substantially upright position. In the event that a closure arrives at the orienting station in a horizontal position, as illustrated in Fig. 5, with the open end disposed either forwardly or rearwardly, the center of gravity of the closure suspended between the beveled edge of the disk 16 and the rail 18 is such as to cause the closure to roll off the disk and over the edge of the rail to be returned to the supply at the lower end of the carrier disk. Likewise, in the event that a conical closure should be disposed between the disk and the rail in a substantially inverted position or with the open end facing outwardly and upwardly, as shown in Fig. 6, the center of gravity will be such as to cause the closure to fall over the edge of the rail and be rejected. In the event that the conical closure should be suspended between the disk and the rail with the open end outwardly and downwardly directed with the lower edge in engagement with the rail, as shown in Fig. 7, the majority of such closures will be urged out of the line and over the edge of the rail by the movement of the disk and contact with adjacent closures. However, in order to assure rejection of the closures which assume such a position, the edge of the rail 18 may be provided with a saw-tooth cut-out portion 134 arranged so that the open cylindrical edge of the outwardly directed closure will drop down and engage the end of the cut-out and be diverted off the orienting disk and over the edge of the rail. Closures assuming an upright or desired position, as shown in Fig. 4, and presenting a cylindrical edge against the rail 18 are capable of bridging across the saw-tooth cut-out to be advanced along the edge of the disk and into the chute, as described.

As illustrated in Figs. 1 and 2, the delivery chute 20 may include a bottom rail 136, a top rail 138, and side rails 140, 142 adjustably supported to accommodate different sizes of closures. The upper end of the chute may be attached to a bracket 144 adjustably mounted on a pin 145 secured in a collar 146 adjustably clamped to the upper extended end of the stationary center shaft 56, and the lower end of the chute may be attached to a bracket 148 secured to a bracket 150 mounted on the supporting bracket 32. The receiving end of the chute may extend above and below the edge of the orienting disk and may be shaped to engage a closure carried along the edge of the disk and to guide the closure into the chute, as illustrated. The top rail 138 may be hinged, as indicated at 152, 154 to permit opening of the upper portion of the chute when desired. In practice, a continuous line of oriented closures are advanced along the edge of the disk and into the chute to keep the chute filled, and when the chute is filled, the oriented closures remain in position on the disk until the line is permitted to advance by withdrawal of closures from the feed chute. Surplus closures at the end of the line are held back by the preceding closures during the continuous movement of the carrier disk, and any surplus closures passing into the orienting area are permitted to flow gently either onto the center of the disk to be returned to the supply, or over the edge of the curved rail 92, as described, the closures having unrestrained freedom of movement at all times during their passage to and through the orienting mechanism so as to prevent jamming or damage to or marring of the finish of the closures. Such closures as may fall on or be urged inwardly over the beveled edge and onto the inner surface of the orienting disk may be carried around by the disk until they engage a diverting rail 156 attached to the lower end of the hub 100 and which is arranged to guide the closures off the disk to be returned to the supply and again carried upwardly on the carrier, as described. As shown in Fig. 4, the inner surface of the disk 16 may be depressed so as to prevent closures falling therein from interfering with the line of oriented closures disposed along the beveled edge of the disk.

In practice, the carrier 12 may be inclined at an angle of approximately 20 degrees from a horizontal plane so that only those cylindrical closures which assume a position of stability on the cork facing 22 are withdrawn from the supply at the lower end of the carrier. Those closures disposed on their sides or in other positions of instability roll or fall back into the supply to be repositioned by contact with other closures and subsequently again withdrawn from the supply. The inclination of the carrier also insures return to the supply of rejected and surplus closures at the upper end of the carrier, such closures rolling or falling back into the supply, while those rejected or surplus closures which maintain a position of stability on the cork facing are carried back thereon to be returned to the supply. Although the orienting disk 16 may be arranged to rotate in a horizontal plane, in practice, it is preferred to dispose the orienting disk at an angle of approximately 5 to 8 degrees from the horizontal and inclined in a direction opposite to the inclination of the carrier 12, such inclination of the orienting disk causing the oriented closures to ride upwardly into the receiving end of the feed chute 20 and to also provide sufficient clearance between the underside of the disk 16 and the upper surface of the center plate 60 to permit rejected closures to roll or fall therebetween to be returned to the supply.

Figure 9:
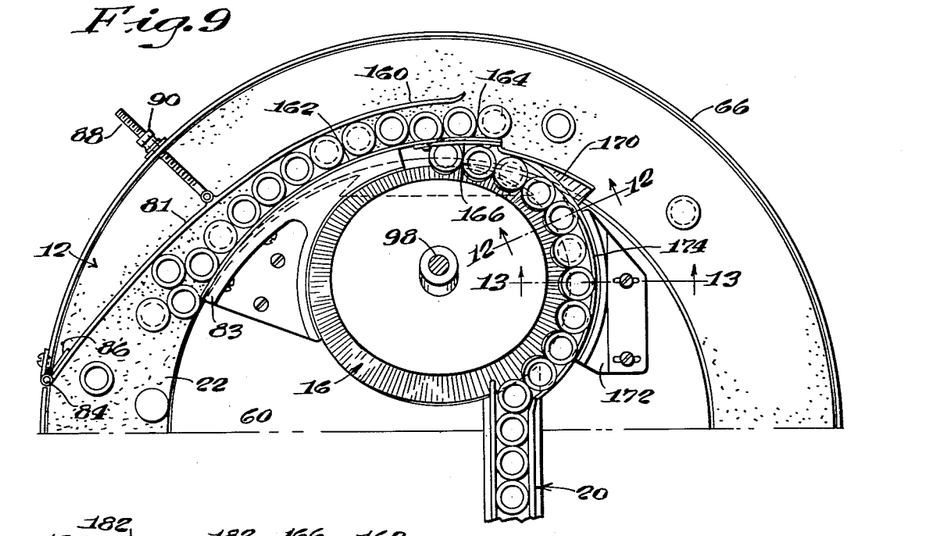
Fig. 9 is a plan view of the upper portion of a modified form of the present closure-handling machine which is particularly adapted for handling a closure which is relatively short with relation to its diameter.

Referring now particularly to Figs. 9 to 13 inclusive, a modified form of closure-handling machine particularly adapted for handling and orienting closures which are relatively short with respect to their diameter may include a similar structure of continuously rotating carrier 12 having a nonslip surface 22, and an orienting disk 16 mounted to be rotated by frictional engagement with the disk 12. In practice, it has been found that the majority of the relatively short or shallow closures tend to naturally assume an inverted position during their progress through the supply hopper and onto the carrier. For example, if a closure assumes an edgewise position with its axis in a substantially horizontal plane, the center of gravity of the closure is such that the closure will fall on its back with the open end up. In operation, the closures withdrawn at random from the group may face either upwardly or downwardly and are advanced upwardly on the carrier until they engage the yieldable guide rail 81 arranged to guide the closures in a single line between the rail 81 and the stationary guide member 83. As shown in Fig. 9, the yieldable guide rail 81 is provided with an extend portion 160 and the guide member 83 is provided with an extend curved rail 162 spaced from the upper edge of the orienting disk 16 and having an opening 164 at its upper end arranged to permit successive closures in the line carried to the top of the carrier to be guided through the opening and into engagement with the upper edge of the orienting disk. As better shown in Fig. 11, a plate 166 may be adjustably secured above the opening 164 to the extended portion of the rail 162 by screw and slot connections 168 in order to adjust the height of the opening to correspond substantially to the height of the closures so as to prevent entrance of nested closures one above the other, the upper closure being removed by engagement with the lower edge of the adjustable plate 166 to fall onto the carrier and returned to the supply.

Figures 10, 11, 12:
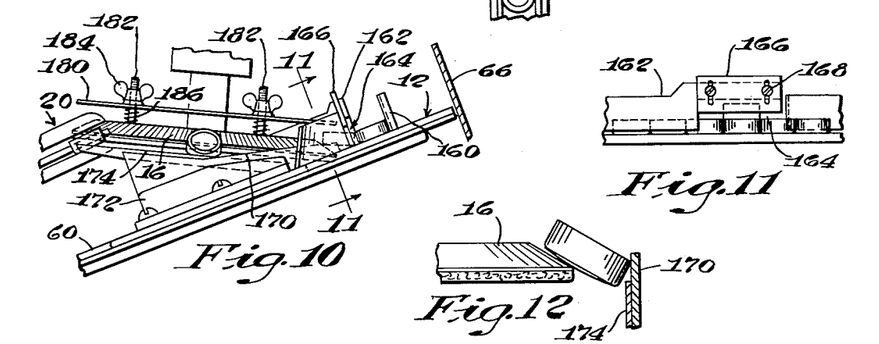
Fig. 10 is a side elevation of the apparatus shown in Fig. 9.
Fig. 11 is a detail view of a rail having an adjustable opening for admitting closures as seen from the line 11—11 of Fig. 10.
Figs. 12 and 13 are cross-sectional views taken on the lines 12—12 and 13—13 respectively of Fig. 9, Fig. 13 showing the short closure in a balanced position between the supporting and advancing elements.
Figures 13, 14:
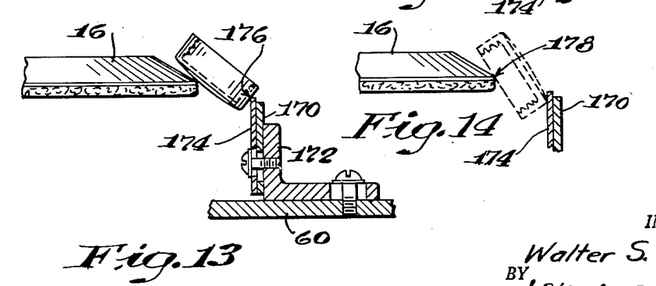
Fig. 14 is a detail view similar to Fig. 13 and showing the closure in a different and non-balanced position between the supporting elements.

In the operation of the closure-handling machine illustrated in Fig. 9, successive closures entering into engagement with the upper edge of the orienting disk 16 are initially suspended between the beveled marginal edge of the disk 16 and the carrier 12, as indicated in Fig. 10, and are advanced in such position until they leave the inner edge of the carrier 12 to be supported on the beveled edge of the disk 16 by an outer stationary curved guide rail 170 concentric with the orienting disk 16 and attached to a bracket 172 mounted on the center plate 60. The closures may be guided into engagement with the outer rail 170 by an outwardly curved rail 171 shaped to permit surplus closures to ride thereover to be returned to the supply, as illustrated in Fig. 9. As illustrated in Fig. 12, a shallow closure passing through the orienting mechanism in an inverted position is retained on the beveled edge of the disk 16 by engagement of the upper edge of the shallow closure with the inner wall of the outer guide rail 170, the closure maintaining a balanced position suspended between the disk and the outer rail. The outer rail 170, spaced a suitable distance from the marginal edge of the disk 16, is arranged at a downwardly inclined angle relative to the substantially horizontal plane of the orienting disk, the lower end of the inclined portion of the outer rail being arranged to guide the closure into engagement with a contiguous inner guide rail 174 also spaced concentrically from the marginal edge of the disk 16 and having its upper edge arranged at a plane substantially parallel to the plane of the orienting disk. The inner rail 172 is arranged to engage the side wall of the inverted shallow closure, as illustrated in Fig. 13, and in operation, the center of gravity of the inverted closure thus suspended between the disk 16 and rail 174 is such as to enable it to maintain its stability and to be advanced in such suspended position and guided into the delivery chute 20 in an inverted position. In other words, the major portion of the weight of the inverted closure being at the closed or bottom end, the bearing points against the bottom wall and the side wall are such as to tend to maintain the closure in a position of equilibrium in an inverted position, the rails 170, 174 being adjustable in height and lateral spacing relative to the marginal edge of the disk to effect a balanced position of the closure. However, in the event that the shallow closure should arrive at the orienting station in a substantially upright position, as illustrated in Fig. 14, the major portion of the weight of the upright closure will be at the top so as to overbalance the closure and cause it to tip downwardly and fall between the disk 16 and the rail 174 and to be returned to the supply. It will be observed that when the closure is in an inverted position, as illustrated in Fig. 13, the major portion of the weight bears against the edge of the rail 174 so that the bearing point 176 comprises the pivotal point about which the closure tends to tip toward the beveled edge of the disk to maintain the closure between the rail and the disk, whereas when the closure is in an upright position, as shown in Fig. 14, the major portion of the weight bears against the edge of the beveled disk 16 so that the bearing point 178 becomes the pivotal point, permitting the closure to tip inwardly off the edge of the rail to be rejected. It will be apparent that those closures assuming an edgewise position, that is with the axis in a horizontal plane, and facing in any direction between the orienting disk and the cooperating guide rails, will tip over and be rejected between the disk and the rail. In order to further assure that closures which have passed through the entrance opening 164 in the guide rail 162 will remain in their flat position and will not again assume a nested position, one above the other, an adjustable and yieldingly mounted ring 180 may be provided which, as herein shown, may be supported upon pins 182 carried by the disk 16, the ring being yieldingly retained against adjusting nuts 184 by springs 186 coiled about the pins and interposed between the disk and the ring.

In practice, the closures passing into the delivery chute 20 in an inverted position may be easily guided into an upright position for delivery to the closure-applying machine in any usual or preferred manner, such as by curved guide rails, not shown, arranged to change the disposition of the closures as they are advanced by gravity down the chute.

Figure 15:
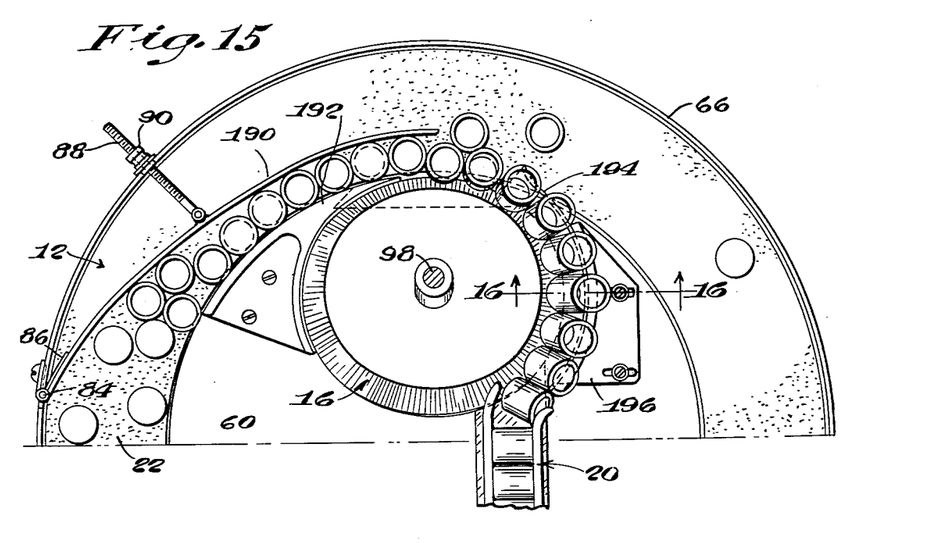
Fig. 15 is a plan view of the upper portion of another modified form of the present machine which is particularly adapted for handling a closure which is relatively tall with relation to its diameter.

As illustrated in Figs. 15 to 18 inclusive, a modified form of closure-handling machine, particularly adapted for handling and orienting closures which are relatively tall with respect to their diameters may include the carrier 12 and orienting disk 16 similar in construction to the above-described embodiments, and provided with an extended yieldable guide rail 190 arranged to guide the relatively tall closures in a single line between the rail 190 and a stationary guide member 192. In practice, it has been found that the majority of the relatively tall closures tend to naturally assume an inverted position, and in operation, the relatively tall closures withdrawn at random from the group may face either upwardly or downwardly as they are advanced into engagement with the guide rails 190, 192, the closures being guided directly into engagement with the beveled marginal edge of the orienting disk, as shown in Fig. 15.

The tall closures, initially suspended between the inner marginal edge of the carrier 12 and the beveled edge of the orienting disk 16, are advanced in such position until they leave the disk 12 to be supported by a cooperating guide rail 194 spaced from and concentric with the orienting disk and arranged with its upper edge in a plane substantially parallel to the plane of the disk 16. As herein shown, the rail 194 is mounted for vertical adjustment in a bracket 196 which in turn is mounted for lateral adjustment, with relation to the marginal edge of the disk 16, on the stationary center plate 60.

Figure 16:
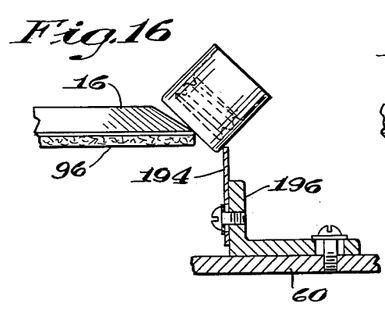
Fig. 16 is a cross-sectional view taken on the line 16—16 of Fig. 15 and showing the tall closure in a position of equilibrium between the supporting and advancing elements.

As illustrated in Fig. 16, a tall closure suspended in an inverted and slightly outwardly tilted position between the beveled edge of the disk 16 and the rail 194 will be balanced so as to maintain its stability in such position, and in operation, the tall closures thus positioned are advanced and gradually tilted radially and outwardly until they assume a substantially horizontal position to be delivered into the upper end of the chute 20 with the axis of the closure in a substantially horizontal plane, as shown in Fig. 15. The horizontally disposed closures may be turned to assume an upright position for cooperation with the closure-applying machine, by engagement with suitable curved rails, not shown, as the closures are advanced by gravity down the chute.

Figure 17:
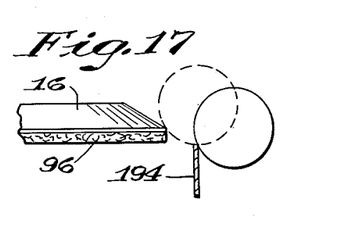
Figs. 17 and 18 are detail views similar to Fig. 16 showing the closures in different non-balanced positions between the supporting elements.
Figure 18:
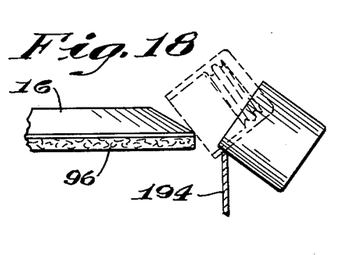

In the event that a tall closure assumes a horizontal position between the disk 16 and the rail 194 with its axis extended longitudinally or tangentially to the path of movement, as illustrated in Fig. 17, and with its open end facing either forwardly or rearwardly, it will be apparent that the center of gravity of the closure will be such as to cause it to roll off the edge of the guide rail 194 to be returned to the supply. In the event that the tall closure assumes an upright position with its open end facing downwardly between the disk 16 and the rail 194, it will be seen that the weight of the closed end of the tall closure will cause it to tip over the rail 194 to be rejected, as illustrated in Fig. 18.

From the above description, it will be observed that the present closure-handling machine is capable of handling and orienting the closures in a smooth and gentle manner, permitting an overflow of the closures at any point in their path of movement where they may meet an undue resistance, offering minimum liability of damage to delicate or fragile closures, the overflowed and rejected closures being returned to the supply to be again advanced into the orienting mechanism. In practice, it has been found that from 70 to 80 percent of the closures withdrawn from the supply assume the predetermined position of orientation on the inclined rotary carrier prior to entering the orienting mechanism so that in operation, a surprisingly uniform and continuous flow of closures passes through the mechanism into the delivery chute in the desired position of orientation. It has also been found that rotation of the carrier at a relatively slow speed, in the order of from 10 to 15 revolutions per minute, produces a supply of from 250 to 400 oriented closures per minute delivered into the feed chute in a substantially uniform and smoothly moving stream, the number of closures delivered depending on the size and shape thereof. Another important feature of the present invention resides in the ability of the machine to handle a wide range of shapes and sizes of closures with a minimum number of adjustments required for the different sizes.

It will be apparent that the present machine is equally adapted for handling and orienting articles other than closures, such as small or medium-size jars commonly used for cold cream and the like, small shallow boxes commonly used for face powders and the like, or other containers, and as used throughout the specification and claims, the terms "closure" and "closure handling" are intended to include such containers.

While the preferred embodiment of the invention has been herein illustrated and described, it will be understood that the invention may be embodied in other forms within the scope of the following claims.

Having thus described the invention, what is claimed is:

1. In a closure-handling machine, in combination, a hopper for containing a bulk supply of substantially cylindrical closures which are heavier at one end than at the other, frictional means for withdrawing and advancing closures at random from the bulk supply, means for guiding the closures into a single line, and orienting mechanism including a rotary disk having a beveled marginal edge mounted to rotate in a substantially horizontal plane, and a stationary supporting rail spaced from and concentric with said disk and between which successive randomly positioned closures in the line are presented, said disk and said rail being positioned relative to each other to balance and support and further advance therebetween successive of those closures which assume a predetermined uniform position of equilibrium with the center of gravity of the closure disposed between said elements in a slightly outwardly tilted position with the heavier end at the bottom, the relative position of said disk and rail being such as to cause the closures presented therebetween in other than said predetermined position with the center of gravity of the closure disposed beyond the edge of one of said elements to be overbalanced and rejected from the orienting mechanism.

2. In a closure-handling machine, in combination, a hopper for containing a bulk supply of conically shaped closures open at one end, means for withdrawing closures at random from the bulk supply, means for guiding the closures into a single line, and orienting mechanism including a rotary disk having a beveled marginal edge mounted to rotate in a substantially horizontal plane, and a stationary supporting rail spaced relatively close to and concentric with the marginal edge of said disk and between which successive randomly positioned closures are presented, said disk and said rail being positioned relative to each other to balance and support and advance therebetween successive of the conical closures which assume a predetermined position of equilibrium with the center of gravity of the closure disposed between said elements in a slightly outwardly tilted position with the open end at the bottom, the relative position of said disk and rail being such as to cause the closures presented therebetween in other than said predetermined position with the center of gravity of the closure disposed beyond the edge of one of said elements to be overbalanced and rejected from the orienting mechanism.

3. A closure-handling machine as defined in claim 2 wherein the stationary supporting rail is provided with a notched portion for engaging the edge of a conical closure assuming a radially extended position between the disk and the rail with its open end directed outwardly whereby to assure rejection of closures assuming such position.

4. In a closure-handling machine, in combination, a hopper for containing a bulk supply of cylindrical closures which are heavier at their closed ends than at their open ends, means for frictionally withdrawing and advancing closures at random from the bulk supply, means for guiding the closures into a single line, and orienting mechanism including a rotary disk having a beveled marginal edge mounted to rotate in a substantially horizontal plane, and a stationary supporting rail spaced a substantial distance from and concentric with the marginal edge of said disk and between which successive randomly positioned closures in the line are presented, said disk and said rail being positioned relative to each other to balance and support therebetween successive of those closures which assume a predetermined uniform position of equilibrium with the center of gravity of the closure disposed between said elements in a slightly outwardly tilted position with the closed and heavier end at the bottom, the relative position of said disk and rail being such as to cause the closures presented therebetween in other than said predetermined position with the center of gravity of the closure disposed beyond the edge of one of said elements to be overbalanced and rejected from the orienting mechanism.

5. A closure-handling machine as defined in claim 4 particularly adapted for handling closures which are relatively short relative to their diameter wherein the orienting mechanism includes an outer concentric supporting rail coextensive with said first rail, said outer rail being downwardly inclined relative to the plane of the orienting disk and arranged to guide the relatively short closures into engagement with the upper edge of said first rail.

6. In a closure-handling machine, in combination, a hopper containing a bulk supply of closures, a rotary carrier arranged to withdraw and advance closures at random from said bulk supply, means for guiding the closures into a single line on the carrier, orienting mechanism including a rotary disk having a beveled marginal edge mounted to rotate in a substantially horizontal plane, and a stationary supporting rail spaced from and concentric with said disk and between which successive randomly positioned closures in the line are presented by said carrier, said disk and said rail being positioned relative to each other so as to balance and support therebetween successive of those closures which assume a predetermined uniform position of equilibrium, and to overbalance and reject those closures presented therebetween which assume a position other than said predetermined position, and a feed chute cooperating with said orienting mechanism for receiving successive uniformly positioned closures to provide a supply thereof.

7. In a closure-handling machine, in combination, a hopper for containing a bulk supply of substantially cylindrical closures which are heavier at one end than at the other, a rotary carrier mounted to rotate in an inclined plane and adapted to withdraw and advance closures at random from said bulk supply, means for guiding the closures into a single line, and orienting mechanism including a rotary disk having a beveled marginal edge and mounted to rotate in a substantially horizontal plane, and a stationary supporting rail spaced from and concentric with said disk and between which successive randomly positioned closures in the line are presented by said carrier, said disk and said rail being positioned relative to each other so as to balance and support therebetween successive of those closures which assume a predetermined uniform position of equilibrium in an outwardly tilted position with the heavier end at the bottom, and to overbalance and reject those closures presented therebetween which assume a position other than said predetermined position, and a feed chute cooperating with said orienting mechanism for receiving successive uniformly positioned closures to provide a supply thereof.

8. A closure-handling machine as defined in claim 7 wherein the means for guiding the closures into a single line includes a resiliently mounted rail arranged to yield in the event of a jam whereby to prevent damage to the closures.

9. A closure-handling machine as defined in claim 7 wherein the horizontally rotated orienting disk is arranged in frictional driving engagement with said rotary carrier.

10. A closure-handling machine as defined in claim 7 wherein the horizontally rotated orienting disk is arranged in frictional driving engagement with said rotary carrier, and wherein provision is made for resiliently urging and retaining the disk in such frictional driving engagement.

11. A closure-handling machine as defined in claim 7 wherein the closures are deposited by the hopper at the lower end of the rotary inclined carrier, and wherein the carrier includes a non-slip facing arranged to frictionally retain the withdrawn closures in engagement therewith during the upward travel of the closures on the carrier and into engagement with the orienting mechanism.

12. A closure-handling machine as defined in claim 7 wherein the closures are deposited by the hopper at the lower end of the rotary inclined carrier, and wherein the carrier includes a non-slip facing arranged to frictionally retain the withdrawn closures in engagement therewith during the upward travel of the closures on the carrier into engagement with the orienting mechanism, the inclined plane of the carrier and the non-slip facing causing the majority of the closures withdrawn and advanced by the carrier to assume the desired position of orientation with the heavier end at the bottom whereby a majority of the closures are presented to the orienting mechanism in the preferred position of orientation.

13. In a closure-handling machine, in combination, means for withdrawing and advancing closures at random from a bulk supply thereof, means for guiding the closures into a single line and orienting mechanism including a rotary disk and a stationary guide rail cooperating with said disk and between which successive randomly positioned closures in the lines are presented, said disk and said rail being positioned relative to each other to balance and support and further advance therebetween successive of those closures which assume a predetermined uniform position of equilibrium with the center of gravity of the closure disposed between said elements, and to overbalance and to reject those closures presented therebetween which assume a position other than said predetermined position with the center of gravity of the closure disposed beyond the edge of one of said elements, the stationary guide rail being provided with a notched portion arranged to be bridged and by-passed by a closure assuming said predetermined position, and wherein the notched portion is arranged to cause a closure assuming a position other than said predetermined position to engage the end of the notch whereby to assure rejection of closures assuming such other position.

(References on following page)

References Cited in the file of this patent

UNITED STATES PATENTS

| Number | Name | Date |
|---|---|---|
| 562,572 | Carpenter | June 23, 1896 |
| 1,139,401 | Colby | May 11, 1915 |
| 1,140,090 | Winter | May 18, 1915 |
| 1,408,497 | Bragden | Mar. 7, 1922 |
| 2,060,182 | Dellaree | Nov. 10, 1936 |
| 2,270,713 | Belada | Jan. 20, 1942 |
| 2,332,790 | Gantzer | Oct. 26, 1943 |
| 2,336,606 | Everett | Dec. 14, 1943 |
| 2,554,788 | Merchant | May 29, 1951 |
| 2,561,413 | Auman | July 24, 1951 |
| 2,568,947 | Carroll | Sept. 25, 1951 |